United States Patent [19]

O'Neil et al.

[11] Patent Number: 5,791,757

[45] Date of Patent: Aug. 11, 1998

[54] VEHICLE LIGHTING SYSTEM UTILIZING A UNIFORM THICKNESS THIN SHEET OPTICAL ELEMENT

[75] Inventors: David Allen O'Neil, Radnor, Pa.; Timothy Fohl, Carlisle, Mass.; Michael Anthony Marinelli, Northville; Jeffrey Thomas Remillard, Ypsilanti, both of Mich.

[73] Assignee: Ford Global Technologies, Inc., Dearborn, Mich.

[21] Appl. No.: 831,099

[22] Filed: Apr. 1, 1997

[51] Int. Cl.⁶ .................................................. F21V 7/04
[52] U.S. Cl. .................... 362/32; 362/31; 362/26; 362/61; 362/80
[58] Field of Search ...................... 362/26, 31, 32, 362/330, 327, 61, 80

[56] References Cited

U.S. PATENT DOCUMENTS

| | | | |
|---|---|---|---|
| 4,141,058 | 2/1979 | Mizohata et al. | 362/32 |
| 5,005,108 | 4/1991 | Pristash et al. | 362/31 |
| 5,043,850 | 8/1991 | Dreyer et al. | |
| 5,099,343 | 3/1992 | Margerum et al. | 362/31 X |
| 5,101,325 | 3/1992 | Davenport et al. | 362/31 |
| 5,111,366 | 5/1992 | Rife et al. | |
| 5,165,772 | 11/1992 | Wu | 362/26 |
| 5,222,793 | 6/1993 | Daveport et al. | 362/32 |
| 5,222,794 | 6/1993 | Windross | 362/32 |
| 5,271,077 | 12/1993 | Brockman et al. | 385/31 |
| 5,359,691 | 10/1994 | Tai et al. | 362/32 X |
| 5,365,413 | 11/1994 | Krammer | 362/32 |
| 5,375,043 | 12/1994 | Tokunaga | 362/31 |
| 5,390,276 | 2/1995 | Tai et al. | 362/32 X |
| 5,465,194 | 11/1995 | Currie | 362/32 |
| 5,526,247 | 6/1996 | Sugiyama | |
| 5,528,709 | 6/1996 | Koike et al. | |
| 5,570,951 | 11/1996 | Bertling et al. | |
| 5,668,913 | 9/1997 | Tai et al. | 362/31 X |
| 5,671,994 | 9/1997 | Tai et al. | 362/31 |

*Primary Examiner*—Ira S. Lazarus
*Assistant Examiner*—Nhat-Hang H. Lam
*Attorney, Agent, or Firm*—Steven A. Maynard

[57] ABSTRACT

A lighting system for an automotive vehicle includes a remote laser light source coupled with a light transmitting fiber optic light guide bundle which illuminates a uniform thickness thin sheet optical element having a plurality of micro-optical wedges formed thereon and a plurality of diffractive optical elements disposed intermediate the fiber optic light guide bundle and the uniform thickness thin sheet optical element for receiving light and redirecting the light to predetermined regions of the plurality of micro-optical wedges.

13 Claims, 2 Drawing Sheets

VEHICLE LIGHTING SYSTEM UTILIZING A UNIFORM THICKNESS THIN SHEET OPTICAL ELEMENT

FIELD OF THE INVENTION

The present invention relates to a vehicle lighting system, and more specifically, to a laser illuminated, uniform thickness, thin sheet optic vehicle lighting system.

BACKGROUND OF THE INVENTION

Conventional light transmission systems used for vehicle head lights or tail lights typically use a bulb and reflector system. In a bulb and reflector system, the filament of the bulb is placed at or near a focal point of a parabolic reflector. The light emitted by the bulb filament is collected by the reflector and reflected outward to form a light beam. A lens is used to shape the light beam into a specified pattern to satisfy vehicle lighting specifications. In a typical automotive application, a conventional bulb and reflector system collects and reflects only thirty percent of the light emitted from the bulb filament into the useful lighting area.

Bulb and reflector systems have several disadvantages, including disadvantages related to aerodynamics and aesthetic styling. For example, the depth of the reflector along its focal axis and the height of the reflector in directions perpendicular to the focal axis greatly limit attempts at streamlining vehicle contours. Additionally, thermal energy given off by the bulb during operation must be considered. The size of the reflector as well as the material used in its construction vary depending upon the amount of thermal energy generated by the bulb filament. Decreasing the size of the reflector requires use of materials with high thermal resistivity for the reflector.

One approach to develop an automotive lighting system for use with newer streamlined body designs is proposed in U.S. Pat. No. 5,434,754, assigned to the assignee of the present invention, which discloses the combination of a fiber optic light guide which transmits light from a remote light source, to a parabolic reflector, through a light manifold, and to an optical element. One problem with such an approach is the necessity for a manifold. A manifold is required to expand the incoming light for distribution across the optical element surface. This results in a substantial portion of unlit area required for the manifold and hence a larger footprint of the overall lamp. This creates vehicle lighting design inflexibility. Another problem is the necessity for collimating optics such as parabolic reflectors. Collimating optics are required to direct collimated light to predetermined regions of the manifold and optical element. These optics add to design and manufacturing costs. A further problem with such an approach is that the optical element gradually decreases in thickness. The optical element has a series of steps formed in the back surface. This necessitates a gradual taper in thickness from the first to the final steps in the series. This variance in thickness results in a portion of the lamp which is thin, weak and susceptible to breakage.

Therefore, it would be desirable to provide a laser illuminated, uniform thickness, thin sheet optic lighting system for a vehicle which accommodates manufacturing and thermal considerations as well as the space limitations dictated by vehicular aerodynamic and styling requirements.

SUMMARY OF THE INVENTION

Responsive to the deficiencies in the prior art, the present invention provides a vehicle lighting system having a uniform thickness thin sheet optical element which has a front surface, a back surface having a plurality of micro-optical wedges formed thereon for receiving and reflecting light through the front surface, and a perimeter side surface generally normal to the front surface. A plurality of light sources for generating light are disposed at predetermined locations about the perimeter side surface. A plurality of diffractive optical elements are disposed intermediate the plurality of light sources and the perimeter side surface for receiving light from the plurality of light sources and redirecting the light through the perimeter side surface and to predetermined regions of the plurality of micro-optical wedges.

In a preferred embodiment of the present invention, a vehicle lighting system further includes a remote light source coupled with a light transmitting fiber optic light guide which in combination illuminates the uniform thickness thin sheet optical element.

An object of the present invention is to provide a uniform thickness, thin sheet optical element tail lamp with a reduced overall footprint.

A feature of the present invention is the utilization of a diffractive optical element which can be designed to expand light. This element eliminates the need for a manifold thereby reducing the overall footprint of the tail lamp which allows for greater vehicle design flexibility. The diffractive optical element further may be designed to collimate and direct light. This element therefore eliminates the need for beam forming optics such as parabolic reflectors which reduces design and manufacturing cost.

BRIEF DESCRIPTION OF THE DRAWINGS

Other features and advantages of the present invention will become apparent to those skilled in the automotive vehicle lighting arts upon reading the following description with reference to the accompanying drawings, in which.

DETAILED DESCRIPTION OF THE PREFERRED EMBODIMENT

Figure 1:
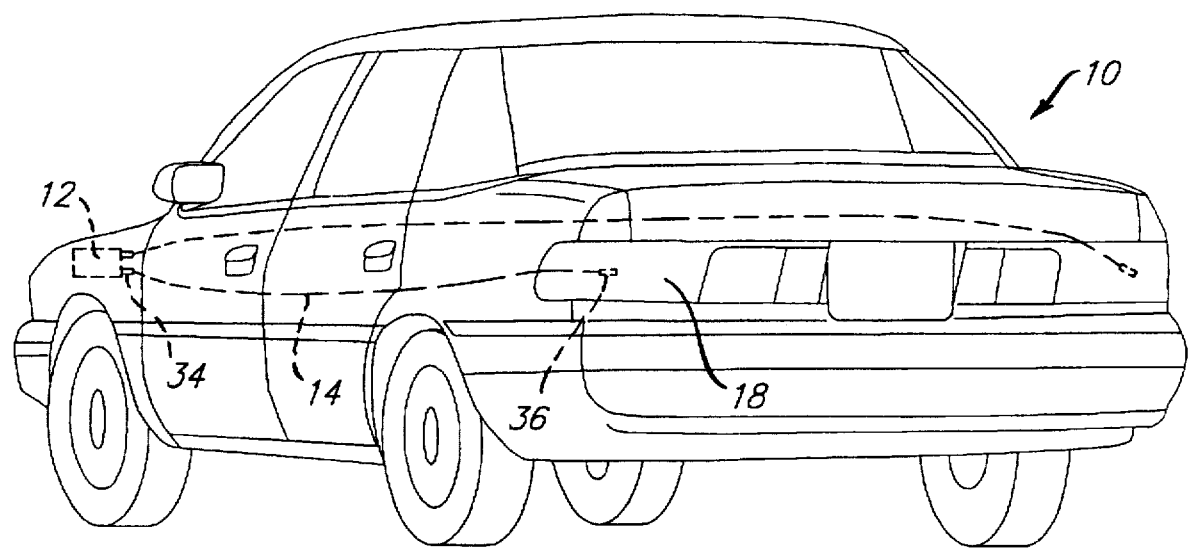
FIG. 1 is a perspective view of an automotive vehicle having a vehicle lighting system.
Figure 2:
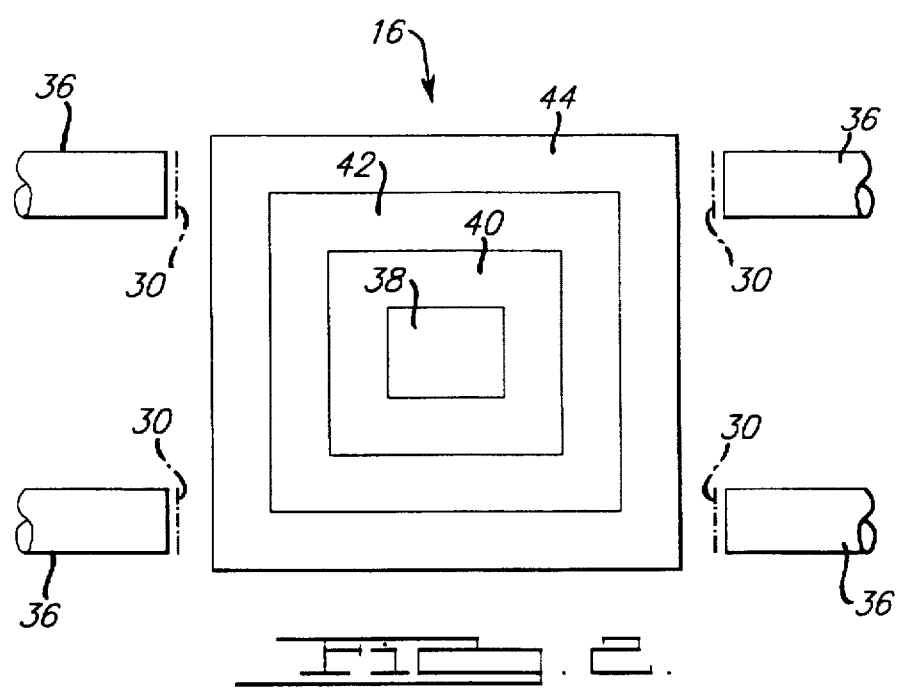
FIG. 2 is a top view of a uniform thickness thin sheet optical element according to the present invention.

Turning now to the drawings, and in particular to FIGS. 1 and 2 thereof, an automotive vehicle 10 is shown having a vehicle lighting system using, in combination, a remote laser light source 12, a fiber optic light guide bundle 14, and a uniform thickness thin sheet optical element 16. The uniform thickness thin sheet optical element 16 of the present invention is configured as a tail lamp 18, but may also be a head lamp or used for other vehicle lighting applications as those skilled in the vehicle lighting arts will recognize. Therefore, the configuration of FIG. 1 is meant only to be illustrative and not limiting.

As illustrated in FIG. 1, preferably a remote laser light source 12 is utilized. The remote laser light source 12 is positioned in the automotive vehicle 10 with consideration given to vehicle design requirements and manufacturing ease relative to the particular lighting objectives. A possible location for the remote laser light source 12 is in the engine compartment (not shown). A single diode laser source is preferably used although other types of lasers as well as other types of remote light sources may be used without departing from the scope of the present invention. Alternatively, multiple laser sources or high intensity LED's may be positioned directly adjacent the uniform thickness thin sheet optical element 16.

Preferably a fiber optic light guide bundle 14 is utilized to transmit light from the remote laser light source 12, as shown in FIG. 1. Preferably each fiber optic light guide bundle 14 has four individual fiber optic light guides. Each of the four light guides has a first end 34 and a second end 36. Because of the high brightness (candela per unit area) of the laser, small diameter (0.1–1.0 mm) light guides are preferably used to transmit the light.

The uniform thickness thin sheet optical element 16, as depicted in FIG. 2, is generally planar, rectangular and ranging in thickness from 10 μm–6 mm. However, a variety of curved profiles may be used for the optical element 16 without departing from the scope of the present invention. The optical element 16 is preferably made from a transparent, solid piece of plastic such as polycarbonate and utilizes the principle of total internal reflection (TIR) to reflect light. TIR is explained in more detail below. Other transparent materials such as acrylics may also be used.

An advantage of using a uniform thickness cross-section is that the optical element 16 is stronger and more robust than the tapered cross-section of previous designs. The uniform thickness allows designers to have more flexibility with the shape and size of the footprint of the optical element 16. Additionally, because of the uniform thickness and resulting robustness the optical element 16 may be used for an outer lens. This would be advantageous because the reduction in lamp componentry would allow for easier assembly. If the optical element 16 were used for an outer lens a clear coating such as teflon would need to be applied to the front surface 20. This coating would have a predetermined index of refraction so that dirt or water on the outer lens would not cause light to escape.

Figure 3:
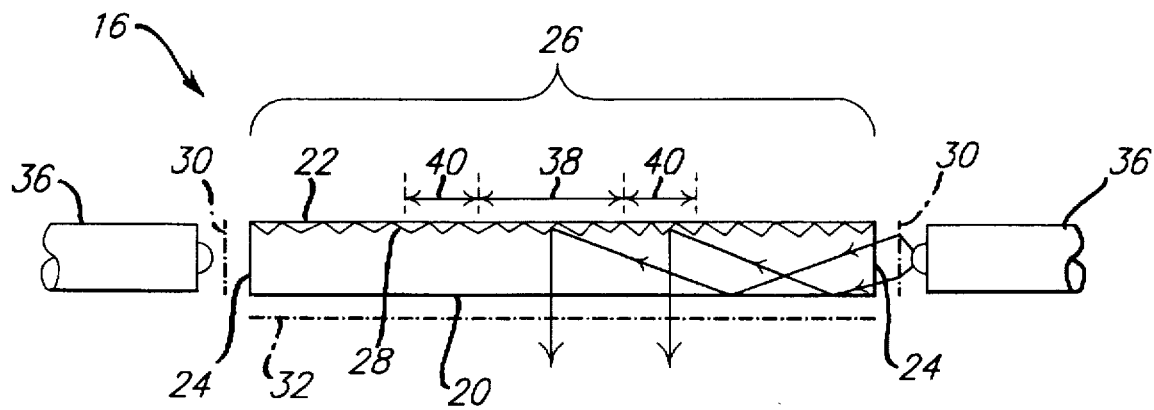
FIG. 3 is a side view of a uniform thickness thin sheet optical element according to the present invention.

As depicted in FIGS. 2 and 3, the optical element 16 has a front surface 20, a back surface 22, and a perimeter side surface 24. The front surface 20 is generally parallel to the back surface 22. The perimeter side surface 24 is generally normal to both the front and back surfaces, 20 and 24 respectively. Disposed upon the back surface 22 are a plurality of micro-optical wedges 26. Depending on the desired beam pattern, micro-optical wedges 26 may also be disposed on the front surface 20. Each micro optical wedge has a reflective surface 28 having a predetermined angle relative to the front surface 20. The predetermined angle varies with each micro-optical wedge 26 depending on the beam pattern desired. The micro-optical wedges 26 of the optical element 16 are preferably divided into four zones: 38, 40, 42, and 44.

A plurality of diffractive optical elements 30 are disposed about the optical element 16 and adjacent to the perimeter side surface 24. The number of diffractive optical elements 30 is preferably equivalent to the number of light sources. This is necessary because the light from the light sources must be processed by the diffractive optical elements 30 before entering the optical element 16. In the preferred embodiment, four fiber optic light guides provide the required light. The diffractive optical elements 30, as disclosed for example in U.S. Pat. No. 5,323,302 and herein incorporated by reference, may be formed integrally with the optical element 16 or may be separately attached to the perimeter side surface 24. The diffractive optical elements 30 are designed to precisely control the amount of light each zone receives. Each part of the required beam pattern can be directed by a diffractive optical element 30 to a specific zone of the micro-optical wedges 26. For example, the "hot-spot" of the beam pattern could be formed by zone 38, while the remaining zones could provide off axis light.

There are advantages to utilizing the diffractive optical elements 30. One advantage is that the diffractive optical elements 30 function to expand incoming light. The manifold portion of previous designs may now be eliminated. This promotes greater design flexibility. Another advantage is that the diffractive optical elements 30 also function to collimate and direct light. The parabolic reflectors of previous designs are now unnecessary. This reduces design and manufacturing cost.

Figure 4:
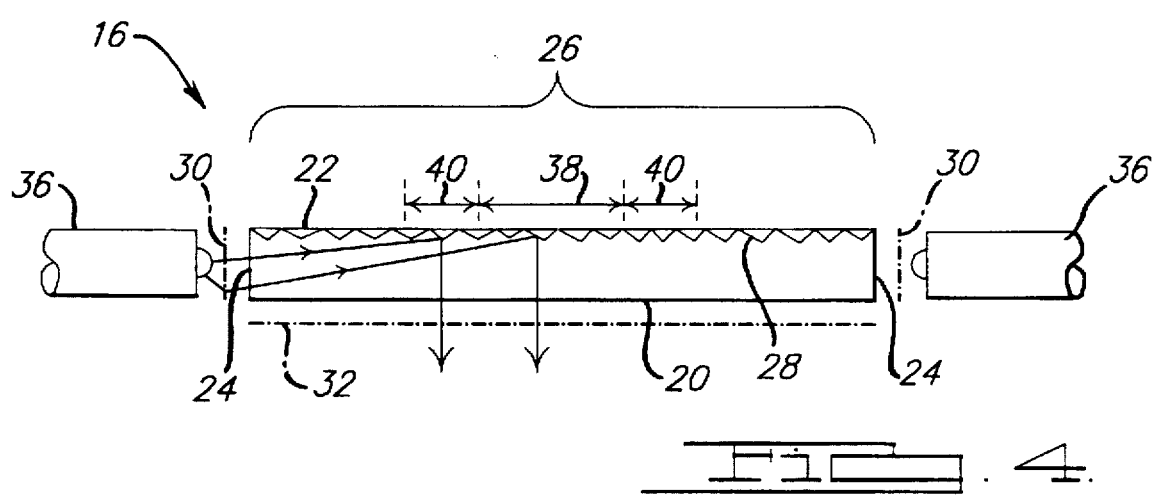
FIG. 4 is a side view of an alternative embodiment of a uniform thickness thin sheet optical element.

As shown in FIGS. 3 and 4, an additional beam forming device 32 may be employed depending on the beam pattern desired. Examples of such beam forming devices 32 are holographic diffusers, pillow optics, or diffractive optics as those known in the art. These optical elements are preferably formed integral with the front surface 20 of the uniform thickness thin sheet optical element 16.

The first end 34 of each fiber optic light guide of the fiber optic light guide bundle 14 is connected to the remote laser light source 12 via a light coupler (not shown) such as those known in the art. The second end 36 of each fiber optic light guide of the fiber optic light guide bundle 14 is preferably situated adjacent to the perimeter side surface 24 of the uniform thickness thin sheet optical element 16 at predetermined locations. The diffractive optical element 30 is preferably positioned intermediate the first end 34 of each fiber optic light guide and the perimeter side surface 24.

In use, light is emitted from the remote laser light source 12, received by the fiber optic light guide bundle 14 via light couplers, transmitted through the fiber optic light guide bundle 14 via TIR, and emitted at the second ends 36 incident upon the diffractive optical elements 30. In a preferred embodiment, the diffractive optical elements 30 divide the light into an angular distribution such that the light is directed through the perimeter side surface 24 toward the front surface 20. The light reflects at least once off of the front surface 20 and is directed to a specific zone of the plurality of micro-optical wedges 26 of the back surface 22. The light striking the micro-optical wedges 26 is redirected via TIR out of the uniform thickness thin sheet optical element 16 through the front surface 20.

Total internal reflection (TIR) of light occurs when an incident angle θ of light upon a surface exceeds a critical angle $θ_c$ given by the equation $θ_c=\sin^{-1}(n_1/n_2)$ wherein $n_1$ is the index of refraction of air and $n_2$ is the index of refraction of plastic. The plastic-air interface can be metalized if necessary to prevent the light rays from reflecting out of the plastic medium.

In an alternative embodiment, as depicted in FIG. 4, the light from the diffractive optical element 30 passes through the perimeter side surface 24 and is transmitted directly to a predetermined micro-optical wedge 26 zone.

Only two embodiments of the vehicle lighting system of the present invention have been described. Those skilled in the automotive lighting arts will appreciate that others may be possible without departing from the scope of the following claims.

We claim:

1. A vehicle lighting system for use in an automotive vehicle, comprising:

a uniform thickness thin sheet optical element having a front surface, a back surface with a plurality of micro-optical wedges formed thereon for receiving and reflecting light through the front surface, and at least one perimeter side surface generally normal to the front surface;

a plurality of laser light sources for generating light disposed at a predetermined location adjacent a single perimeter side surface; and at least one planar, diffractive optical element thin sheet grating disposed intermediately of said light source and the perimeter side surface, and being parallel to the single perimeter side surface, for receiving light from said laser light source and redirecting the light through the perimeter side surface and to predetermined regions of the plurality of micro-optical wedges.

2. A vehicle lighting system according to claim 1, wherein the redirected light passing through the perimeter side surface reflects off the front surface before being directed to the predetermined regions of the plurality of micro-optical wedges.

3. A vehicle lighting system according to claim 1, wherein said uniform thickness thin sheet optical element is comprised of a polymeric transparent optical material.

4. A vehicle lighting system according to claim 1, wherein said uniform thickness thin sheet optical element has a thickness between 10 μm–6 mm.

5. A vehicle lighting system according to claim 1, wherein said uniform thickness thin sheet optical element has a substantially planar cross-section.

6. A vehicle lighting system according to claim 1, wherein said uniform thickness thin sheet optical element has a predetermined curved cross-section.

7. A vehicle lighting system according to claim 1, wherein said uniform thickness thin sheet optical element is an outer lens for a vehicle lamp.

8. A vehicle lighting system for use in an automotive vehicle, said vehicle lighting system comprising:

a plurality of laser light sources for generating light;

a uniform thickness thin sheet optical element having a front surface, a back surface having a plurality of micro-optical wedges formed thereon for receiving and reflecting light through the front surface, and at least one perimeter side surface generally normal to the front surface; and a plurality of thin sheet diffractive optical element gratings disposed along a single perimeter side surface, intermediate a corresponding laser light source and the single perimeter side surface, for receiving laser light and redirecting diffracted laser light through the perimeter side surface and to predetermined regions of the plurality of micro-optical wedges.

9. A vehicle lighting system according to claim 8, wherein the redirected light passing through the perimeter side surface reflects off the front surface before being directed to the predetermined regions of the plurality of micro-optical wedges.

10. A vehicle lighting system according to claim 8, wherein said uniform thickness thin sheet optical element is comprised of a polymeric transparent optical material.

11. A vehicle lighting system according to claim 8, wherein said uniform thickness thin sheet optical element has a thickness between 10 μm–6 mm.

12. A vehicle lighting system according to claim 8, wherein said uniform thickness thin sheet optical element has a substantially planar cross-section.

13. A vehicle lighting system according to claim 8, wherein said uniform thickness thin sheet optical element has a predetermined curved cross-section.

* * * * *